US012719582B1

(12) United States Patent
Prather et al.

(10) Patent No.: US 12,719,582 B1
(45) Date of Patent: Aug. 25, 2026

(54) ELECTRO-OPTIC MODULE, LUNEBERG LENS HAVING SAME AND RELATED METHODS OF OPERATION

(71) Applicant: Phase Sensitive Innovations, Inc., Newark, DE (US)

(72) Inventors: Dennis Prather, Newark, DE (US); Janusz Murakowski, Bear, DE (US); Christopher Schuetz, Avondale, PA (US); Garrett Schneider, New Castle, DE (US); Shouyuan Shi, Newark, DE (US); Timothy Creazzo, West Grove, PA (US)

(73) Assignee: Phase Sensitive Innovations, Inc., Newark, DE (US)

( * ) Notice: Subject to any disclaimer, the term of this patent is extended or adjusted under 35 U.S.C. 154(b) by 177 days.

(21) Appl. No.: 18/201,723

(22) Filed: May 24, 2023

Related U.S. Application Data

(60) Provisional application No. 63/345,087, filed on May 24, 2022, provisional application No. 63/408,426, filed on Sep. 20, 2022.

(51) Int. Cl.

| | |
|---|---|
| ***H04B 10/60*** | (2013.01) |
| *H04B 10/40* | (2013.01) |
| *H04B 10/50* | (2013.01) |

(52) U.S. Cl.
CPC ............. *H04B 10/60* (2013.01); *H04B 10/40* (2013.01); *H04B 10/503* (2013.01); *H04B 10/505* (2013.01)

(58) Field of Classification Search
None
See application file for complete search history.

(56) References Cited

U.S. PATENT DOCUMENTS

| | | | | |
|---|---|---|---|---|
| 5,278,924 A * | 1/1994 | Schaffner | G02F 1/0356 | 385/9 |
| 2003/0006941 A1* | 1/2003 | Ebling | H01Q 25/008 | 343/911 L |
| 2007/0296640 A1* | 12/2007 | Colburn | H01Q 19/062 | 343/783 |
| 2014/0139370 A1* | 5/2014 | Hamner | G01S 13/4463 | 342/175 |
| 2016/0013550 A1* | 1/2016 | Artemenko | H01Q 3/245 | 370/280 |
| 2016/0334451 A1* | 11/2016 | Ohmae | G01R 29/0885 | |
| 2018/0269586 A1* | 9/2018 | Kawahata | H01Q 21/28 | |
| 2021/0138257 A1* | 5/2021 | Dolgoff | G01R 33/60 | |

* cited by examiner

*Primary Examiner* — Darren E Wolf
(74) *Attorney, Agent, or Firm* — Muir Patent Law, PLLC

(57) ABSTRACT

A Luneburg lens-based radio head for a receiver, transmitter or transceiver may comprise a Luneburg lens or equivalent lens and a plurality of electro-optic modules. The electro-optic modules provide a conversion between RF sector beam at the Luneburg lens and an optical signal containing the information of the RF sector beam. When the radio head comprises a receiver, up-conversion modules formed on a surface of the Luneburg lens. Each of the up-conversion modules includes an antenna element, which picks up the incoming focused RF beam and converts it to an RF electric signal, and an electro-optic modulator that up-converts the RF electric signal to the optical domain by modulating an optical carrier with the RF electrical signal provided by the antenna element. The up-converted optical signal may be transmitted to a processor via an optical fiber for down-stream processing.

18 Claims, 10 Drawing Sheets

ELECTRO-OPTIC MODULE, LUNEBERG LENS HAVING SAME AND RELATED METHODS OF OPERATION

RELATED APPLICATIONS

This application is a non-provisional of U.S. Application No. 63/345,087 filed May 24, 2022, and a non-provisional of U.S. Application No. 63/408,426 filed Sep. 20, 2022, the entire contents of each of these applications hereby being incorporated by reference in its entirety.

BACKGROUND

Ideally, each point on the surface of a Luneburg lens is a focal point, and more specifically, each point on the surface of an ideal Luneburg lens is the focal point for parallel radiation incident on its opposite side. Thus, using a Luneburg lens with radiofrequency (RF) receivers and transmitters provides spatially separated focal points of the Luneburg lens corresponding to different RF electro-magnetic beams on the opposite side of the Luneburg lens being received or transmitted. Using a Luneburg lens with an RF receiver allows incoming RF beams to be focused at spatially separated focal points of the Luneburg lens and thus allows simultaneous capturing of these received RF beams by corresponding antennas positioned at those focal points. Similarly, using a Luneburg lens with an RF transmitter allows generation of an RF signal at a focal point of the Luneburg lens to form an RF beam having a transmission direction corresponding to the location of the focal point of the Luneburg lens. Thus, a transmitter using a Luneburg lens may simultaneously generate multiple, differently directed RF beams.

However, in prior solutions, the RF signals are processed in the electrical domain. The receiving modules and transmitting modules are purely electronic. Amplifiers, mixers, oscillators, RF waveguides used to process the signals make not only make these modules bulky and complex, but may also distort the RF electrical signal during processing. This disclosure relates to receivers, transmitters and transceivers that receive and/or transmit radio frequency (RF) electromagnetic signals, where the RF signal is processed in the optical realm.

SUMMARY

A Luneburg lens-based radio head for a receiver, transmitter or transceiver may comprise a Luneburg lens or equivalent focusing lens and a plurality of electro-optic modules. The electro-optic modules provide a conversion between RF sector beam at the Luneburg lens and an optical signal containing the information of the RF sector beam.

Luneburg lens-based radio head for a receiver may comprise an up-conversion modules formed on a surface of the Luneburg lens. Each of the up-conversion modules includes an antenna element, which picks up the incoming focused RF beam and converts it to an RF electric signal, and an electro-optic modulator that up-converts the RF electric signal to the optical domain by modulating an optical carrier with the RF electrical signal provided by the antenna element. The up-converted optical signal may be transmitted to a processor via an optical fiber for downstream processing.

According to disclosed embodiments, a receiver includes a focusing lens, such as a Luneburg lens or other collimating lens, to capture and focus received RF beams to a corresponding focal spot at a back surface (the output side in a receiver) of the lens. Multiple RF beams from different angles of arrival (AoA) may be received and processed simultaneously. Each location of a focused RF beam at the output of the Luneburg lens corresponds to and identifies the AoA of a corresponding RF sector beam captured by the Luneburg lens. Each antenna may be paired with an electro-optic modulator, which, in some examples, may be formed in an area no larger than that of the antenna. The electro-optic modulator up-converts the RF signal captured by the antenna into an optical signal which is then transmitted via an optical fiber or other optical waveguide for processing.

Embodiments also directed to a radio head for a transmitter which may comprise electro-optic devices comprising a photodetector to receive an optical signal and generate an electrical current that is then radiated out of its corresponding antenna element.

BRIEF DESCRIPTION OF THE DRA WINGS

The accompanying drawings are included to provide a further understanding of exemplary device, system and method embodiments of the invention. In the drawings.

DETAILED DESCRIPTION

The present disclosure now will be described more fully hereinafter with reference to the accompanying drawings, in which various exemplary implementations are shown. The invention may, however, be embodied in many different forms and should not be construed as limited to the exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular exemplary implementations only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

Terms such as "about" or "approximately" or "on the order of" may reflect amounts, sizes, orientations, or layouts that vary only in a small relative manner, and/or in a way that does not significantly alter the operation, functionality, or structure of certain elements.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present.

As used herein, elements described as being "electrically connected" are configured such that an electrical signal can be passed from one element to the other. Similarly, elements described as being "optically connected" (or in optical communication) are configured such that an optical signal can be transmitted from one element to the other. It should be appreciated that the electrical (or optical) signal transmitted between the electrically (or optically) connected elements may be attenuated, split or combined with other electrical (or optical) signals as it travels between the electrically (or optically) connected elements.

Figure 1A:
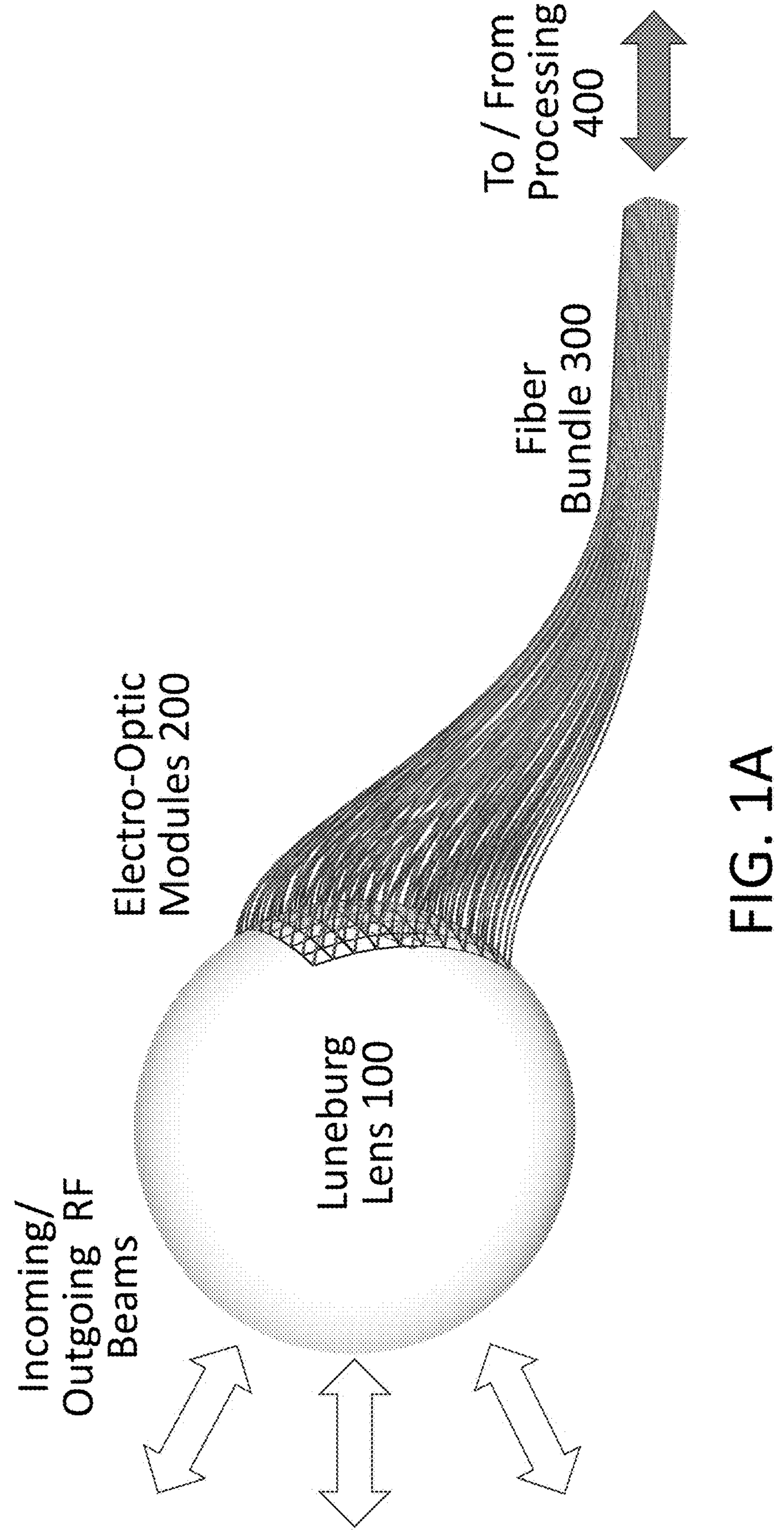
FIGS. 1A-1C illustrate a Luneburg lens-based radio head according to an embodiment of the present invention.
Figure 1B:
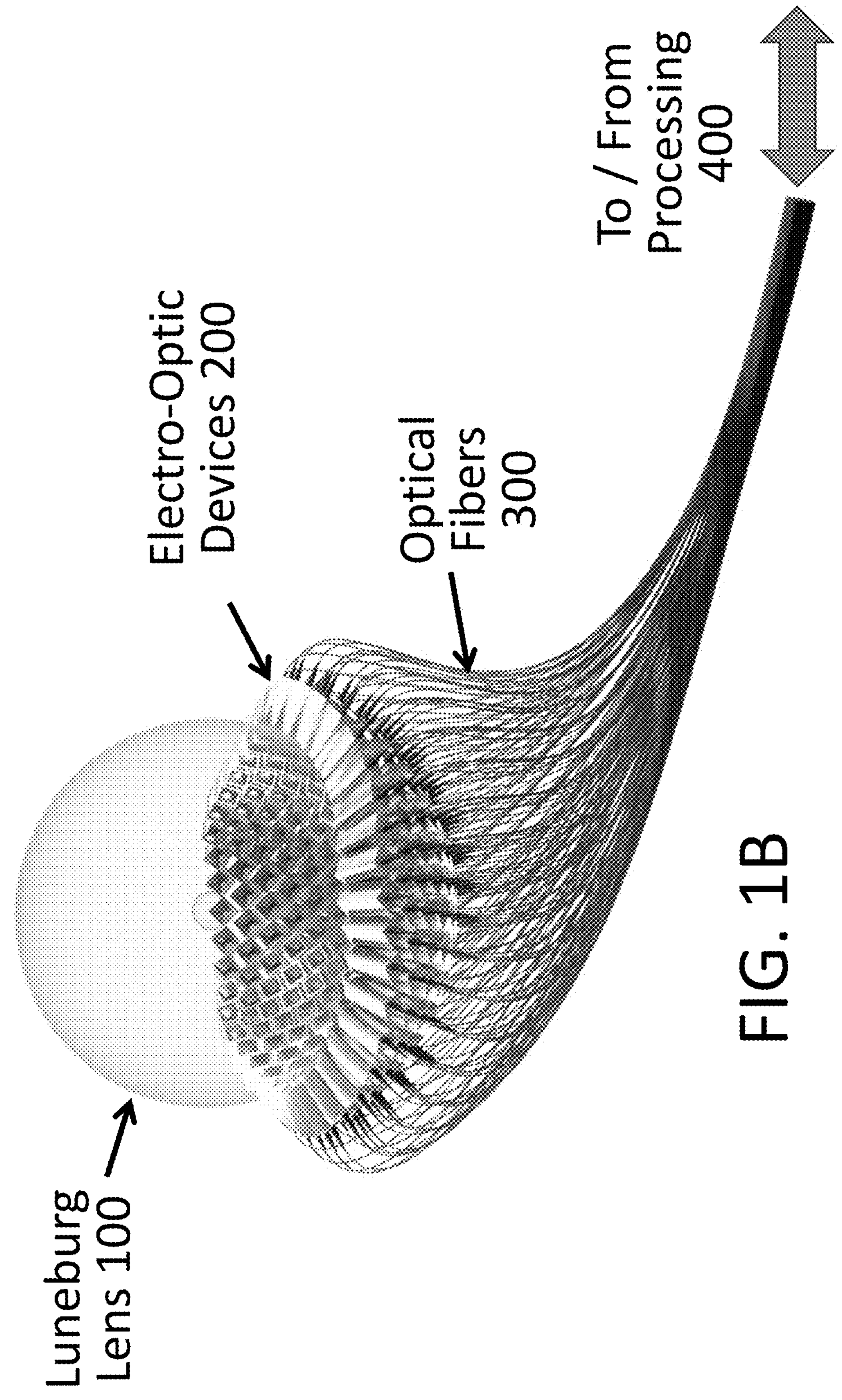
Figure 1C:
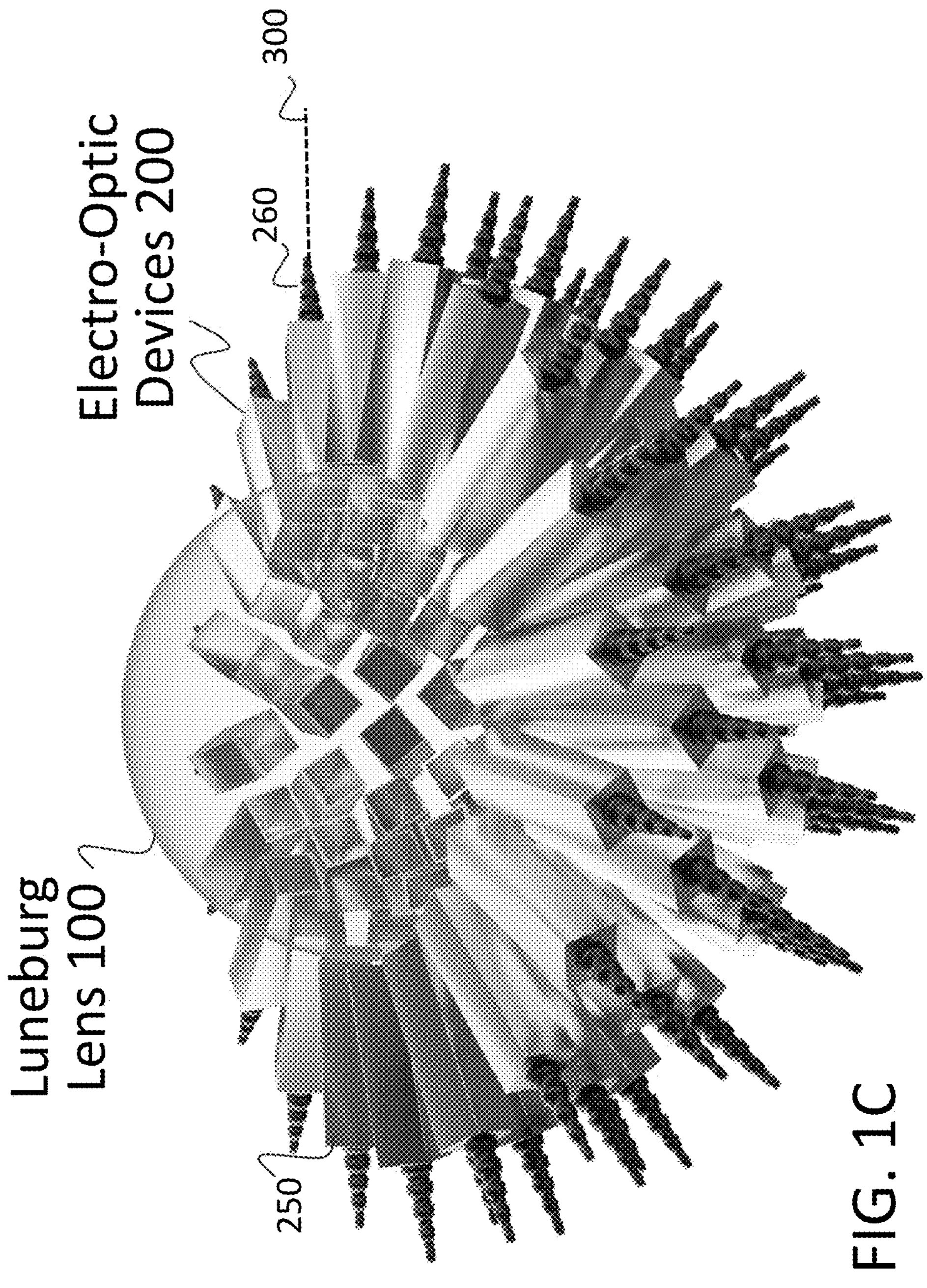

FIGS. 1A-1C illustrate a Luneburg lens-based radio head according to an embodiment of the present invention which may be implemented as a receiver, a transmitter and/or a transceiver. As a receiver, a Luneburg lens 100 focuses the incoming radio-frequency (RF) beams (e.g., electromagnetic plane waves) onto its back surface. As a transmitter, a Luneburg lens 100 converts a point source at a focal point on its back surface to a collimated RF beam that has a transmission direction determined by the location of the point source/focal point. These RF beams received and/or transmitted by the Luneburg lens may be referred to a "sector RF beams" to reference the different locations or sectors of these RF beams in the world external to the receiver/transmitter. The Luneburg lens 100 may be a sphere and/or have a spherically shaped surface. However, as discussed herein, the surface of the Luneburg lens 100 may take other forms that do not have a spherical surface. The back surface of the Luneburg lens 100 is populated with an array of electro-optic devices 200. In a receiver, each electro-optic device 200 may be an RF-to-optical up-conversion modules each comprising an antenna element and an electro-optic modulator that converts the received RF signal to an optical signal. As a transmitter, the electro-optic device 200 may comprise a photodetector that converts an optical signal being sent to the lens 100 from a processor 400 to an RF signal that is transmitted from an antenna element of the electro-optic device 200. As a transceiver, the electro-optic device 200 may comprise the antenna element, the electro-optic modulator and the photodetector. In a transceiver, the same antenna element of the electro-optic device may be used to both receive and transmit RF beams, although different antenna elements may be used. Similarly, in a transceiver, the same optical fiber may be used to both receive and transmit the optical version of the RF beam, although multiple fibers may be used. It will be appreciated that the electro-optic device of the transceiver may have the same structure and operations as described herein with respect to the receiver and/or transmitter, and thus repetitive description may be omitted.

Each electro-optic device 200 has an optical connection to processor 400 through a corresponding optical fiber 300 of an optical fiber bundle. FIGS. 1B and 1C illustrates a plurality of electro-optic devices 200 including housings 250 that are attached to the Luneburg lens 100 (e.g., with an adhesive). An optical connector 260 (e.g., a ferrule) is connected to the housing 250 at one end to connect an optical fiber 300 to the electro-optic device 200. At an end of the housing 260 opposite to the optical connector 260, the housing 250 may have an opening to expose the antenna element 210 to the backside of the Luneburg lens. The housing 250 may be formed of a conductor (e.g., a conductive metal) to shield the RF signals of each electro-optic device 200 from one another. In some examples, the end of the housing 250 adjacent the Luneburg lens 100 may be closed with side formed of an RF transparent material. The remainder of the electro-optic device 200 may be formed within the housing 250. For example, when the electro-optic device 200 is an up-conversion module (e.g., 200-up as discussed elsewhere herein), the antenna element 210 and the electro-optic modulator (formed, e.g., with RF transmission line 220 and TFLN layer 230) may be formed within the housing 250. In other examples, the housing 250 may be omitted. For example, the electro-optic device 200 may be formed as a stack of integrated layers which may be embodied as a photonic integrated circuit and/or joined together in a package (e.g., surrounded by and/or encased in an encapsulant (a protective material), such as an epoxy molding compound (EMC) or other protective material, and the electro-optic device 200 may be monolithic.

The following discussion will now mostly refer to use of the Luneburg lens 100 with respect to a receiver. However, it will be apparent that the description is equally applicable to a transmitter and/or transceiver with appropriate modifications to the electro-optic devices (as described elsewhere herein). In a receiver, the electro-optic devices 200 are up-conversion modules. Although embodiments described herein refer to a Luneburg lens to focus RF sector beams, other lenses that focus the received RF beams to corresponding locations incident onto an array of antenna elements, which can lie on any desirable surface, may be used. RF sector beams arriving as plane waves at the from different directions (different AoAs) focus on corresponding different points of the back surface of the Luneburg lens. The Luneburg lens acts as an RF beam-former forming a focused RF beam spot at a corresponding location at the back surface of the Luneburg lens for each RF sector beam captured by the Luneburg lens. The Luneburg lens thus may spatially separate the RF sector beams to different positions on its back surface. Note, however, the RF beam spots may have different centers, but may still overlap in certain instances (depending on the RF frequencies and/or separation of the AoA of the RF sector beams). The location of the focused RF beam spot thus corresponds to and identifies the AoA of the corresponding RF sector beam captured by the Luneburg lens. It should be appreciated that the focused RF beam spots may not be fully focused. For example, different frequencies of the RF beams may result in different depth of focus that may not correspond to the back surface of the Luneburg lens. In some examples, an RF beam having a frequency corresponding to a central RF operating frequency (e.g., corresponding to a central operating frequency of the antennas) may be focused onto a single antenna which converts the RF beam to an RF electrical signal. However, other RF beams may not be fully focused and thus may impinge several antennas of several up-conversion modules 200-up. Downstream processing by processor 400 may determine the frequencies of the RF signals being processed and thus extract the information of a single RF beam provided to several up-conversion modules 200-up.

Figures 2A, 2B:
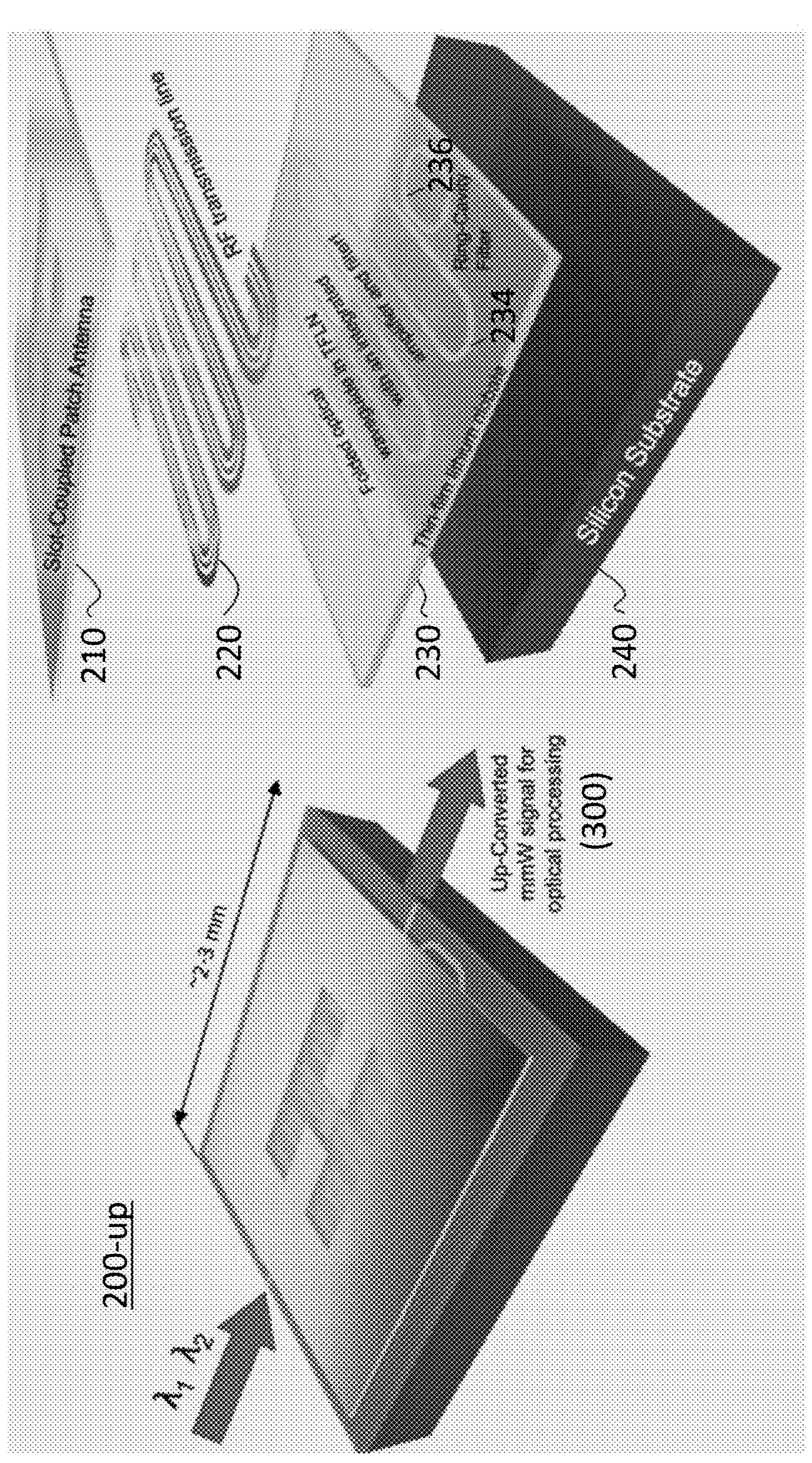
FIGS. 2A and 2B illustrate details of an exemplary an up-conversion module.

FIGS. 2A and 2B illustrate details of an exemplary up-conversion module 200-up, FIG. 2B being an exploded view of FIG. 2A. A plurality of such up-conversion modules 200-up are formed on the back surface of the Luneburg lens 100 (each represented as a square on the Luneburg lens 100 in FIG. 1A). Each of the up-conversion modules 200-up includes an antenna element, which picks up the incoming focused RF beam and converts it to an RF electric signal, and an electro-optic modulator that up-converts the RF electric signal to the optical domain by modulating a suitable optical carrier, such as an optical tone generated by a laser, with the RF electrical signal provided by the antenna element. Each up-conversion module 200-up is connected to a corresponding optical fiber 300 to transmit the modulated optical signal for downstream processing.

The up-conversion module 200-up may be formed as a monolithic structure in which an antenna element 210 and an electro-optic modulator are integrated. In this example, the up-conversion module 200-up is formed as a stack of a base substrate 240, an optical modulation layer 230 (e.g., a thin film lithium niobate layer), an RF transmission line layer including an RF transmission line 220 and an antenna layer including antenna 210. Each of these layers may be formed from several component layers, or may be a single layer (such as a homogenous bulk base substrate or a homogenous LN layer). Additional layers (not shown), such as insulating layers that are transparent to RF electromagnetic radiation, may be formed between and/or as part of the layers of the stack. The stack of substrate 240, RF transmission line 230, modulation (TFLN) layer 220 and antenna element 210 may be formed in a housing 250 and include an optical connector 260 to connect an optical fiber 300 to the output of an optical waveguide 234 of the TFLN layer 220.

The base substrate 240 may act as both a handle or support substrate as well as a portion of the cladding forming optical waveguides of the up-conversion module described herein. The base substrate 240 may be a silicon substrate.

The modulation layer 220 may be a TFLN layer. In some examples, the TFLN layer may be the TFLN layer of a conventional LN substrate having the base substrate layer 240 as its handle. The up-conversion module 200-up may be embodied in a single chip, such as in a photonic integrated circuit (PIC) and/or be implemented in a planar optical circuit of a semiconductor chip (having electronic integrated circuits and/or electronic components formed therein as well), and the layers of the up-conversion module may be deposited and patterned using conventional semiconductor processing techniques. For example, an LN substrate comprising the base substrate 240 and the TFLN layer may be patterned using standard photolithographic patterning, such as depositing a photoresist layer, patterning the photoresist layer via photolithographic exposure (selective exposure of the photoresist layer with a photolithographic mask) and developing (or dissolving in a chemical developer) the exposed photoresist layer to form a photoresist pattern. The photoresist pattern may then be used as a mask to etch the TFLN layer (below the photoresist pattern) to transfer the pattern of the photoresist pattern to the TFLN. Thus, the TFLN layer may be selectively etched to form a trench corresponding to the optical waveguide. An optical waveguide core material may be formed in the trench of the TFLN layer to form the optical waveguide 230. For example, an optical core material is deposited on the TFLN layer and in the trench, with remaining portions on the TELN layer surface being removed by planarizing (e.g., CMP). The resulting optical core material in the trench comprises the core of an optical waveguide, with the TFLN layer surrounding the core comprising cladding of the optical waveguide. The optical waveguide and its core are labeled in the figures as 234.

In some examples, the optical waveguide 234 of the TELN layer may be formed by selectively doping the TFLN layer with a dopant, such as titanium (Ti). The Ti-diffused portions of the TFLN layer may thus form the optical waveguide core of the optical waveguide. As shown, the optical waveguide 234 may be formed to meander (e.g., to fold back and forth across the TFLN layer) to fit a longer length of the optical waveguide within the footprint of the antenna element 210 (or within a square having sides equal to the maximum length of the antenna).

Similar patterning processes may be used to form the RF transmission line 220, the antenna 210 and connection vias connecting the RF transmission line and the antenna (as well as connection vias connecting different metal layers of the antenna when appropriate according to the antenna design). For example, each of the antenna layer and the RF transmission line layer may include a selectively patterned insulating layer (e.g., patterned like the TFLN layer) in which a conductor (e.g., a conductive metal) is formed.

Other processes and materials may be used to form the up-conversion module 210-up. In some examples, the up-conversion module 210-up may be embodied as all or part of a printed circuit board (PCB) where a PCB substrate (e.g., polyimide layer) is used in place of the base substrate. Standard PCB manufacturing techniques may be used to similarly form and pattern the different layers of the up-conversion module 200-up. It will be appreciated that a variety of materials other than those specifically mentioned herein may be used. For example, materials other than LN may be used as the optical signal modulation layer (e.g., having a refractive index that alters in response to an applied electric field).

Each upconversion module 200-up may have an optical input to provide one or more optical tones as optical carriers to the input of its corresponding optical waveguides 234. Each upconversion module 200-up may have an optical output to provide a modulated optical signal output from the corresponding waveguide 234. As described in more detail elsewhere, the modulated optical signal may comprise a sideband of the optical carrier created during modulation of the optical carrier. The optical input and optical output to/from up-conversion module 200-up may be provided by/provided to the same optical fiber 300 or may be provided separately with different optical fibers 300 of the optical fiber bundle. Alternatively, the optical carrier may be generated locally at the Luneburg lens and provided to the optical waveguide 234 without use of an optical fiber 300 of the optical fiber bundle.

The RF transmission line 220 is formed above the optical waveguide in the same pattern to overlap the optical waveguide 234. In this example, the RF transmission line 220 is formed as a coplanar transmission line and includes a center strip having the same pattern as the optical waveguide 234 and that extends directly above the optical waveguide core 234. The coplanar RF transmission line 220 also includes two outer adjacent lines on either side of the center strip. Thus, in this example, the RF transmission line layer have a single conductive metal layer to form the coplanar RF transmission line 220. The RF transmission line layer may also include an insulating layer (not shown) in which the RF transmission line 220 is formed (e.g., a patterned insulating layer etched to form trenches corresponding to the center strip and outer lines in which the conductive metal forming the RF transmission line 220 is formed). In some examples, the two outer lines of the RF transmission line 220 may be connected to a reference potential (ground) and the center strip may carry the RF electrical signal captured by the antenna. An electromagnetic field may emanate from the RF transmission line 220, extending between the center strip and each outer adjacent line of the RF transmission line 220 to extend into the TFLN layer, thereby modulating the optical signal carried by the optical waveguide 234 in accordance with the RF electrical signal carried by the RF transmission line 220. The modulated optical signal carried by the optical waveguide 234 may comprise an optical sideband containing information preserving the frequency, phase and amplitude information of the RF electrical signal of the RF transmission line 220.

The RF transmission line 220 may take different forms and need not comprise a coplanar RF transmission line. For example, the RF transmission line 220 may be formed as a micro-strip or as another type of RF transmission line and/or may be an RF waveguide. Further, conductors of the RF transmission line 220 need not be formed in a single horizontal plane. In some examples, conductors of the RF transmission line 220 may be formed on opposite sides of the TELN layer. The shape the RF transmission line 220 and/or its elements may correspond to the shape of the optical waveguide 234 and be positioned adjacent the optical waveguide 234 such that the electric field emanating from the RF transmission line 220 extends through the TFLN layer 230 at locations around the optical waveguide 234. For example, the electric field emanating from the RF transmission line 220 may extend in a direction perpendicular to the lengthwise direction of the optical waveguide core 234 (perpendicular to the light transmission direction of the optical waveguide 234). The electric field may travel through the optical waveguide core 234 and through the TFLN layer 234 on opposite sides of the optical waveguide core 234.

The RF transmission line 220 is connected to the antenna element 210. Electrical vias (not shown) may extend between the antenna element 210 and the RF transmission line 220 to connect the antenna 210 to the RF transmission line 220 and transmit the RF electrical signal generated by the antenna 210 to the RF transmission line 220. For example, both the antenna layer (having antenna element 210) and the RF transmission line layer (having RF transmission line 220) may comprise a conductor (e.g., metal forming the antenna element 210/the RF transmission line 220) in a corresponding patterned insulating layer as described herein. An insulating layer may be formed between the antenna layer and the RF transmission line layer and one or more conductive vias may extend between the antenna element 210 and the RF transmission line 220 (e.g., connecting the center strip of the coplanar RF transmission line 220 to the antenna element 210). The antenna element 210 may take other forms other than a slot coupled patch antenna shown in FIG. 2B, such as a patch antenna without a slot, a dipole antenna, a loop antenna, etc. In addition, when the antenna element 210 includes a ground plane, the ground plane may also constitute a ground plane of the RF transmission line 220. It will be appreciated that the term "antenna" may refer to an antenna as well as an antenna array. Thus, use of the terms antenna element and antenna array maybe used herein to refer to distinguish between the same.

The upconversion module 200-up thus comprises an antenna element 210 and an electro-optic modulator (in this example, formed by the RF transmission line 220 operatively coupled to the optical waveguide 234 in the TFLN layer 230). The RF sector beam captured by the antenna element is thus converted a corresponding optical signal containing the frequency, phase and amplitude information of that RF sector beam. More specifically, the antenna element 210 generates an RF electrical signal in response to the RF electromagnetic wave captured by the antenna element 210 (e.g., the corresponding RF sector beam focused onto the antenna element 210 at the backside of the Luneburg lens 100). The RF transmission line 220 is connected to the antenna element 210 to receive the RF electrical signal generated by the antenna element 210 and transmit a corresponding electromagnetic field into the TFLN layer 230 to modulate the optical carrier provided to the optical waveguide 234 as described herein. Thus, different RF sector beams, arriving at the receiver at different angles of arrival (AoAs) maybe spatially separated by the Luneburg lens 100 and separately captured by different up-conversion modules 200-up which then simultaneously generate modulated optical signals that each contain frequency, phase and amplitude information of the corresponding RF sector beam.

With respect to a plan view, the size of the antenna element 210 may be confined to a square having sides on the order of the wavelength of the received RF signal and may extend in one direction and/or two perpendicular directions of a wavelength of the corresponding center operating frequency of the receiver. In some examples, with respect to a plan view, the size of the antenna element 210 may be confined to a square having sides of ½ of this wavelength and more specifically, extend in one direction and/or two perpendicular directions a length of ½ of this wavelength. With respect to this plan view, the size of the down-conversion module may be this wavelength squared or less. For example, the up-conversion module may be a chip or package having dimensions of this wavelength squared, or about ½ this wavelength×½ this wavelength (e.g., +/−10% to 20% of ½ this wavelength×½ this wavelength), and the antenna element 210 may extend across the top surface of the chip from one side to an opposite side of the chip. For example, the substrate 240, the TFLN layer 230, the RF transmission line 220 may all be located within the foot print of the antenna element 210. Thus, the electro-optic modulator of the upconversion module 200-up, formed with the TFLN layer 230 and RF transmission line 220 may be located within the footprint of the antenna element 210. Thus, each antenna 210 may be paired with an electro-optic modulator that may be formed in an area no larger than that of the antenna (e.g., the electro-optical modulator may be located adjacent to the antenna in the footprint of the antenna).

The TFLN layer 230 may also include one or more integrated photonic filters 236, e.g., one or more ring cavity filters, formed adjacent to the optical waveguide core 234. The photonic filters 236 may be formed at the same time (i.e., with the same process and materials) used to form the optical waveguide 234 in the TFLN layer 230. Each photonic filter 236 may be an optical waveguide formed as a discrete loop and integrated in the TFLN layer. Each photonic filter 236 may optically couple with the optical waveguide 234 to filter (dampen or remove) certain frequencies of the optical signal transmitted by the optical waveguide 234 and amplify other signals of optical signal transmitted by the optical waveguide (e.g., those not filtered corresponding to the resonant frequency of the filter). The filter may pass a sideband of the optical carrier frequency resulting from modulating the optical carrier signal with the RF electrical signal provided by antenna element 210 and suppress the optical carrier signal and the other sideband. In addition or instead, an optical filter may be inserted into the downstream optical processing of the modulated optical signal after it is output by the up-conversion module 200-up to extract a single sideband.

In addition, the up-conversion module 200-up may include an amplifier (not shown) between the antenna element 210 and the opto-electric modulator (formed of RF transmission line layer and TFLN layer 234 layer in this example), to increase the amplitude of the electric signal before modulation. Each electro-optic modulator may then transmit the resulting modulated optical beam to an optical fiber 300 or another type of optical waveguide suitable for guiding optical beams. The optical fibers 300 carrying the modulated optical beams may be gathered into a fiber bundle, as shown in FIG. 1, to convey the up-converted signals to photo-detectors; each fiber may carry a signal associated with a distinct incoming one of the RF beams incident on the Luneburg lens 100.

The up-conversion module 200-up may take many configurations. For example, the RF transmission line layer of the embodiment illustrated in FIGS. 2A and 2B may be omitted and the radiating arm(s) of the antenna element 210 may radiate an electric field to the optical modulation layer to modulate the optical carrier provided to the optical waveguide 234. In this modification, the path of the optical waveguide 234 should correspond to the form of the radiating arm(s) of the antenna element. For example, the optical waveguide 234 be located in the TNFL layer beneath the radiating arms and may extend (i.e., have a light transmission path direction) in an extending direction of the radiating arms. The antenna element 210 may generate an electric field extending perpendicular to the extending direction of the radiating arms which penetrates the TFNL layer 220 and penetrates the optical waveguide 234 in a direction perpendicular to the extending direction of the optical waveguide. In some examples, adjacent ones of the plurality of antenna elements formed on the backside of the Luneburg lens 100 may be connected into a tightly coupled array. The electro-optic modulator of the up-conversion module 200-up in this alternative may thus be considered to comprise the TFNL layer (including its optical waveguide 234) and the antenna element 210. The antenna element 210 may generate an RF electrical signal that resonates in the radiating arm(s) of the antenna element 210 and radiates the electric field to the TNFL layer to modulate the optical carrier provided to the optical waveguide 234.

Figure 3:
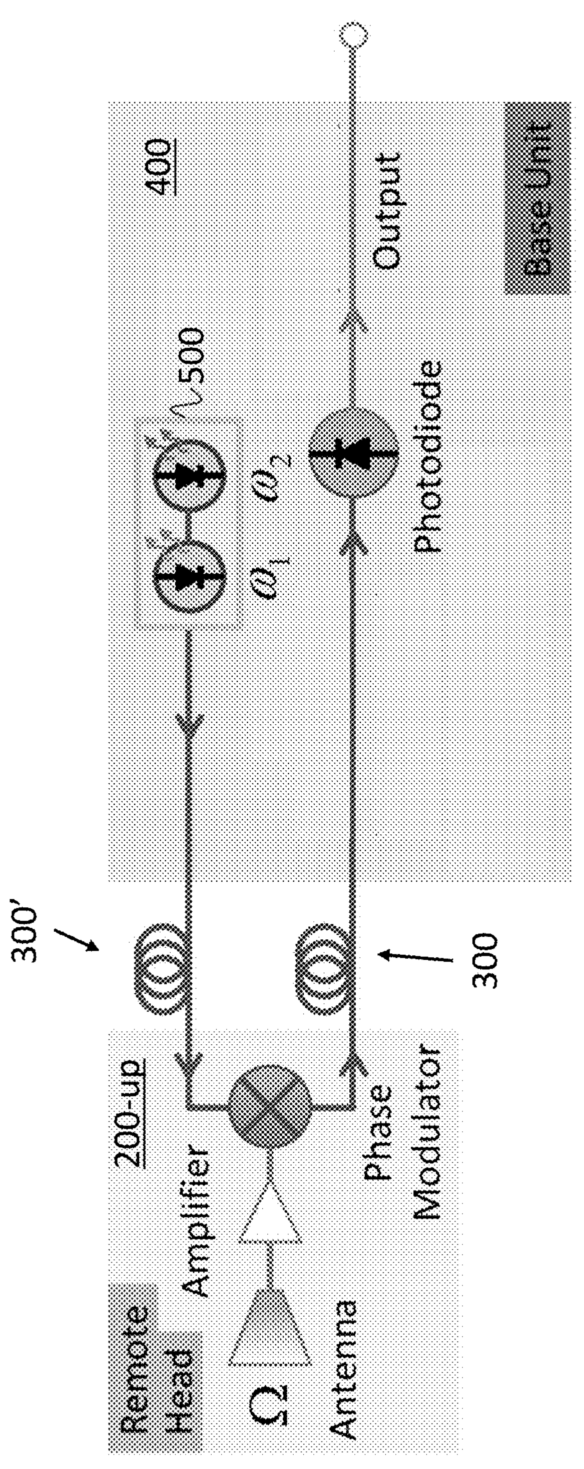
FIG. 3 illustrates exemplary details of the up-conversion module of FIGS. 2A and 2B.

FIG. 3 illustrates exemplary details of up-conversion module 200-up optically connected to a processor 400 via optical fibers 300 and 300'. For simplicity, only a single up-conversion module 200-up is illustrated to be connected to processor 400, however all of the up-conversion modules 200-up may be connected to the processor 400 (e.g., as shown in FIGS. 1A and 1B). The up-conversion module 200-up of FIG. 3 may be implemented with the up-conversion module 200-up of FIGS. 2A and 2B (and its variants) as described herein. The electro-optic devices 200 of FIGS. 1A to 1C may be implemented with the up-conversion module 200-up of FIG. 3 and connected to and operate with processor 400 as described herein. It will be appreciated that although an amplifier is shown as part of the up-conversion module 200-up, use of an amplifier is optional, as described herein.

The processor 400 may be a base unit of the receiver. The modulated optical signals generated by each upconversion module 200-up may be provided to processor 400 for further processing via optical fibers 300. At the output of the optical fibers, the photo-detectors (e.g., photo-diodes) may convert the optical signals back into electrical domain. Each photo-detector may generate an electrical signal preserving information provided by the corresponding RF sector beam (e.g., frequency, phase and/or amplitude of the received RF sector beam may be represented in the RF electrical signal such that information encoded in the RF sector beam may be extracted).

FIG. 3 illustrates an optical source 500, such as a tunable optical pair source (TOPS), may be configured to generate two optical tones provided by two lasers. In one example, a primary laser generates an optical carrier signal and a secondary laser generates and a reference optical signal. The optical carrier signal has a first frequency and the reference optical signal has a second frequency. The optical carrier signal of the primary laser may be provided as an input to the optical waveguide 236 of the electro-optical modulator of the up-conversion module 200-up and may be modulated by the electro-optical modulator as described herein. The reference optical signal of the secondary laser acts as a local oscillator for the down-conversion process of the RF information contained in the modulated optical signal output by the electro-optical modulator. The first frequency and second frequency differ by a set amount (where this set difference in frequency may be modified by an input to the optical source, such as by a user input (e.g., programmed)). In addition, the optical carrier signal and the reference optical signal may be phase-locked to each other. For example, a variation in phase in the optical carrier signal produced by the primary laser may cause the same variation in phase in reference optical signal of the secondary laser. The optical source 500 may be a tunable optical pair source (TOPS) such as disclosed in "Radiofrequency signal-generation system with over seven octaves of continuous tuning," authored by Schneider et al., and published in Nature Photonics, online Jan. 20, 2013, and/or as disclosed in U.S. Pat. No. 10,965,100, issue Mar. 30, 2021, the contents of each of which is hereby incorporated by reference in its entirety. In this example, only the optical carrier signal need be provided to the up-conversion modules 200-up and the reference optical signal may be mixed with the modulated optical signal at any desired point after its formation by the electro-optical modulator and before generating the RF electrical signal by the photodiode of the processor 400.

In some embodiments, both optical tones generated by the two lasers may be provided to the upconversion module 200-up and both optical tones may be modulated by the electro-optic modulator of the upconversion module 200-up. A sideband of the modulated first optical tone may be mixed with the second optical tone to generate a first heterodyne signal and a sideband of the modulated second optical tone may be mixed with the first optical tone to generate a second heterodyne signal, where the first heterodyne signal and the second heterodyne signal have the same beat frequency, and in their combined form, an electrical signal corresponding to the beat frequency of the first and second heterodyne signal, is extracted by the photodiode. For example, the photonic heterodyne link with homodyne detection described in U.S. Application No. 63/408,426 filed Sep. 20, 2022, incorporated by reference in its entirety, may be used to implement this approach.

The processor 400 may also include conventional signal processing circuitry to down-convert the electrical signals generated by the photodiodes, such IF mixers, an A/D converters, a CPU/computer to extract encoded data from the digitized signals, etc.

It will be appreciated that the receiver described herein may be implemented with a simplified radio-head unit (e.g., the portion of the receiver connected to the fiber bundle, including the front end of the receiver attached to the fiber bundle), that comprises the Luneburg lens and the array of up-conversion modules 200-up as compared to the purely electronic radio-head unit. For example, no electronic oscillators and no electronic mixers need be employed by the radio-head (and the front end of the receiver). Similarly, electronic amplifiers may also be omitted in the radio head (and the front end of the receiver). Simplifying the radio-head unit may be beneficial as it may lead to improved reliability and thereby lowering the cost of operation by reducing field-service requirements.

Systems based on the present invention may be deployed both indoors and outdoors.

Embodiments of the invention also include a transmitter using a Luneburg lens (or other RF collimating lens). The transmitter has substantially the same structure as the receiver and operates in 'reverse,' i.e., electro-optic modulators may modulate the carrier optical signal to generate modulated optical signals that are delivered by the optical fiber bundle to down-conversion modules at the back surface of the Luneburg lens where a photodetector can be used to convert the optical signal to an RF signal to be radiated out of the antenna element. Each down-conversion module comprises a photo-detector in place of the electro-optic modulator of the up-conversion module (or in addition to when implemented as a transceiver). Each down-conversion module comprises a photo-diode/antenna pair and may be formed monolithically. For example, each the down-conversion module may comprise a photo-diode/antenna pair having the structure and interconnections described in U.S. Pat. No. 10,908,499, issued Feb. 2, 2021, hereby incorporated by reference in its entirety. The antenna-coupled photo-detectors convert the optical signals to RF waves that are launched into the Luneburg lens. The latter converts these waves to RF sector beams (using a received reference optical signal—in the same manner as the down conversion by the photodetectors described above) and launches them into free space. In this arrangement, each photo-detector is responsible for launching an RF sector beam in a specific direction (AoA), corresponding to the position of the down-conversion module on the back side of the Luneburg lens. The reference optical signal is also provided to the down-conversion modules to facilitate the down-conversion by the photo-detectors, such as by combining with the modulated optical signals and transmitted along with the modulated optical signals via the optical fiber bundle, or separately provided to the down-conversion modules and combined with the modulated optical signals at the down-conversion modules.

For embodiments comprising a transceiver, the structure of the receiver and transmitter described herein may be combined. A plurality of conversion modules may be formed in an array on the backside of a Luneburg lens (i.e., in the same manner as the receiver up-conversion modules and the transmitter down-conversion modules). For each conversion module, the same antenna and substrate may be used for both the receiver and the transmitter portions of the transceiver. The transceiver module may be monolithic (e.g., formed as a chip using conventional semiconductor processing) and may include the antenna, the RF transmission line, the electro-optic modulator of the receiver and the photo-detector of the transmitter. In addition, a multi-core fiber may be used to connect to the transceiver conversion module to exchange the two modulated optical signals (for the receiver and transmitter of the transceiver) between the transceiver transmission module at the frontend of the transceiver and the backend of the transceiver.

FIGS. 4A, 4B, 5A, 5B, 5C and 6 illustrate alternative implementations that may be used with the systems described herein with respect to FIGS. 1A, 1B, 1C, 2A, 2C and 3.

Figure 4A:
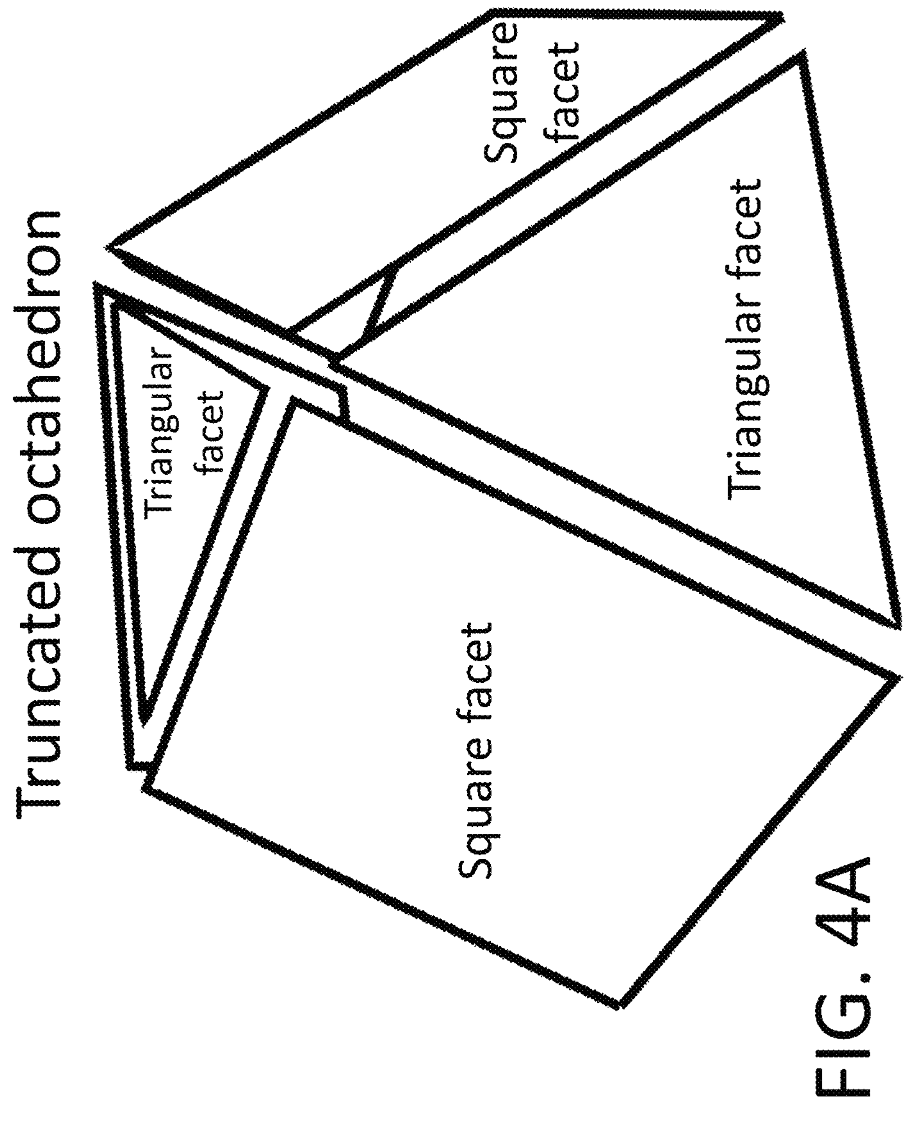
FIGS. 4A, 4B, 5A, 5B, 5C and 6 illustrate alternative implementations that may be used with the systems described herein with respect to FIGS. 1A, 1B, 1C, 2A, 2C and 3, where FIGS. 4A and 4B illustrating exemplary details of a faceted array, FIGS. 5A-5C illustrating a dielectric dome having a faceted cavity, and FIG. 6 illustrating use of a modified Luneburg lens.

Phased array antennas may be used to form simultaneous multiple RF beams for receivers ("RX") and/or transmitters ("TX"). Such phased arrays are typically planar, that is, the antennas of the phased arrays are distributed in two dimensions on a flat surface. As such, a planar phased array may be unsuitable for forming radio beams over a wide range of solid angles due to degraded beam-forming ability for directions near the array plane. To alleviate this degradation, multiple flat phased arrays may be used, each covering a smaller range of solid angles. FIG. 4A shows an example of such a faceted phased array that includes four triangles and three squares obtained from a truncated octahedron by removing its bottom half. In the illustration, the facets are slightly shifted and resized to show features that may be normally hidden. In this configuration, each facet has its own phased array covering a portion of the solid angle around its broadside so that in combination, the seven arrays cover $2\pi$ steradians. The facets may be populated with regular arrays (e.g., a 2D array of regularly or irregularly arranged antennas). In some implementations, for best coverage of the area, the triangular facets may be populated with antennas on a triangular lattice whereas the square facets may be populated with arrays on either square or triangular lattice. However, other configurations of antenna arrays may be considered for the flat facets, including irregular arrays.

Figure 4B:
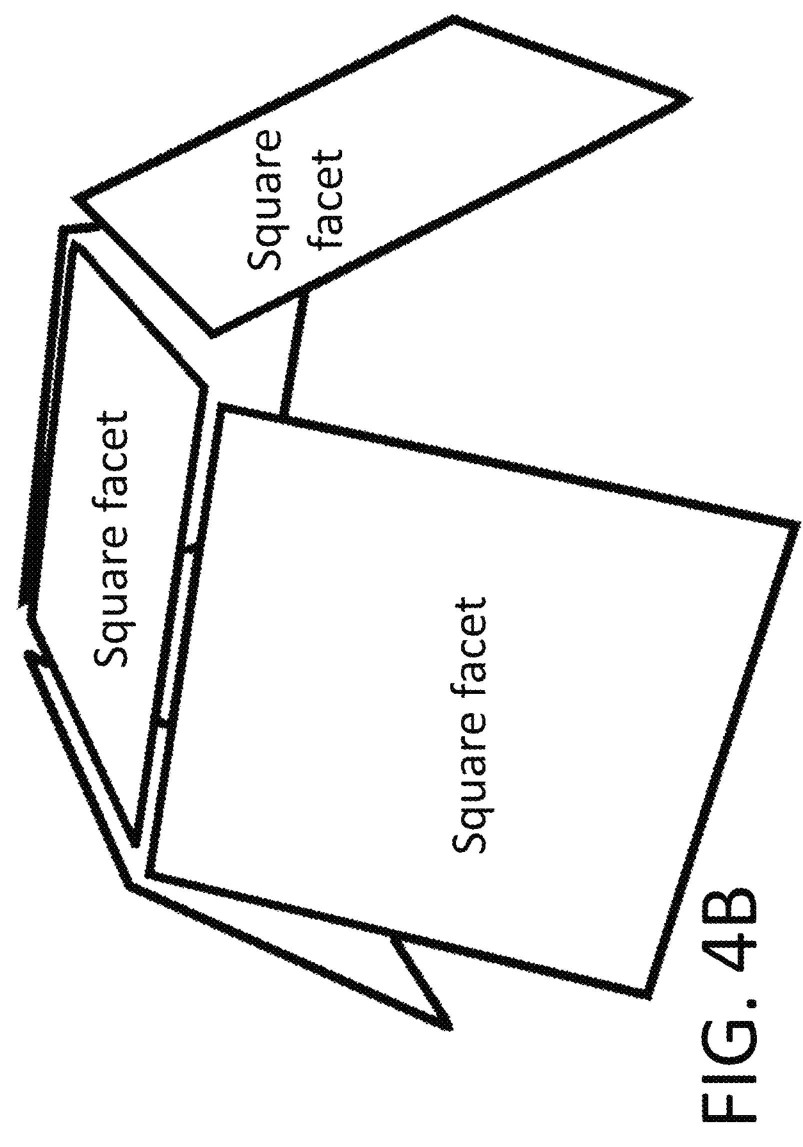

For consistency, and to facilitate fabrication, the facets may all be, for example, rectangular. FIG. 4B shows an example of an array where all facets are square. This configuration resembles a cube with the bottom facet removed and the side facets tilted off vertical. The tilt angle of the side facets is chosen so that the solid angle coverage may fill the $2\pi$ steradians. For example, with a 30-degree tilt off vertical, the elevation-direction coverage of +/−60 degrees, and azimuth coverage of +/−75 degrees of the side facets, in combination with +/−60 degrees coverage of the top facet, may provide a full $2\pi$ steradians coverage of the antenna array. Furthermore, the facets may be not exactly planar, but the surface may deviate from planar geometry. For example, the individual facets may be segments of a sphere, or of an ellipsoid, or of a hyperboloid, or of a paraboloid, or of a cylinder, or of any other two-dimensional surface.

The faceted phased arrays may be formed to include a cavity behind the facets. This cavity may be used to house electronic and/or optical components serving to support the operation of the system.

The faceted phased arrays comprising multiple planar RF-optical phased arrays may utilize one or more free-space optical processors to form multiple simultaneous beams, as described, e.g., in U.S. Pat. No. 9,525,489, or in U.S. Pat. No. 11,152,700, or in U.S. patent application Ser. No. 17/457,528, or in U.S. patent application Ser. No. 17/457,519, or in publication WO 2020/163881 A2, each of these patent documents being incorporated by reference in its entirety. Alternatively, the phased arrays may utilize photonic integrated circuits (PIC-s) for RF beam forming in the optical domain. In the latter case, AB mapping disclosed in U.S. patent application Ser. No. 17/160,676 (herein incorporated by reference in its entirety) may be utilized to form RF beams in 2D, e.g., azimuth and elevation, using only a planar PIC and a linear array of optical waveguides.

The faceted phased arrays comprising multiple planar RF-photonic phased arrays may also be used in combination with a tunable optical paired source (TOPS) described in publication "Radiofrequency signal-generation system with over seven octaves of continuous tuning" by G. J. Schneider, J. A. Murakowski, C. A. Schuetz, S. Shi, D. W. Prather, that appeared in Nature Photonics, Volume 7, Issue 2, pp. 118-122 (2013) (herein incorporated by reference in its entirety), or in U.S. Pat. No. 8,848,752, or in U.S. Pat. No. 11,424,594, each of these patents being incorporated by reference in its entirety. Combining the faceted phased arrays with TOPS may allow the down-conversion of the incoming radio-frequency signal to intermediate frequency (IF) or to baseband to facilitate subsequent processing. When implemented in a TX system, the combination of the faceted phased arrays with TOPS may allow the up-conversion of IF signals to RF for transmission.

Figure 5A:
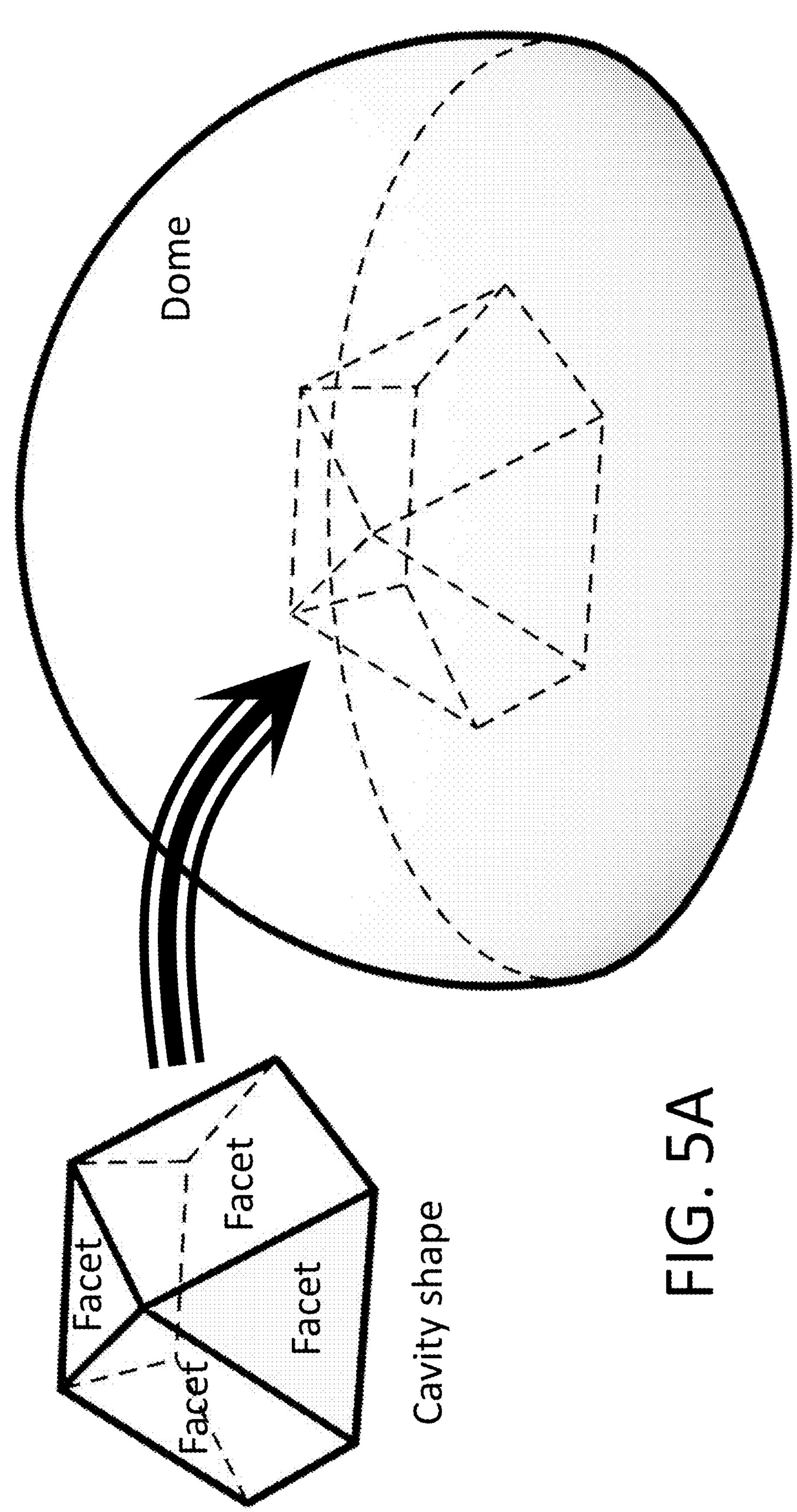
Figures 5B, 5C:
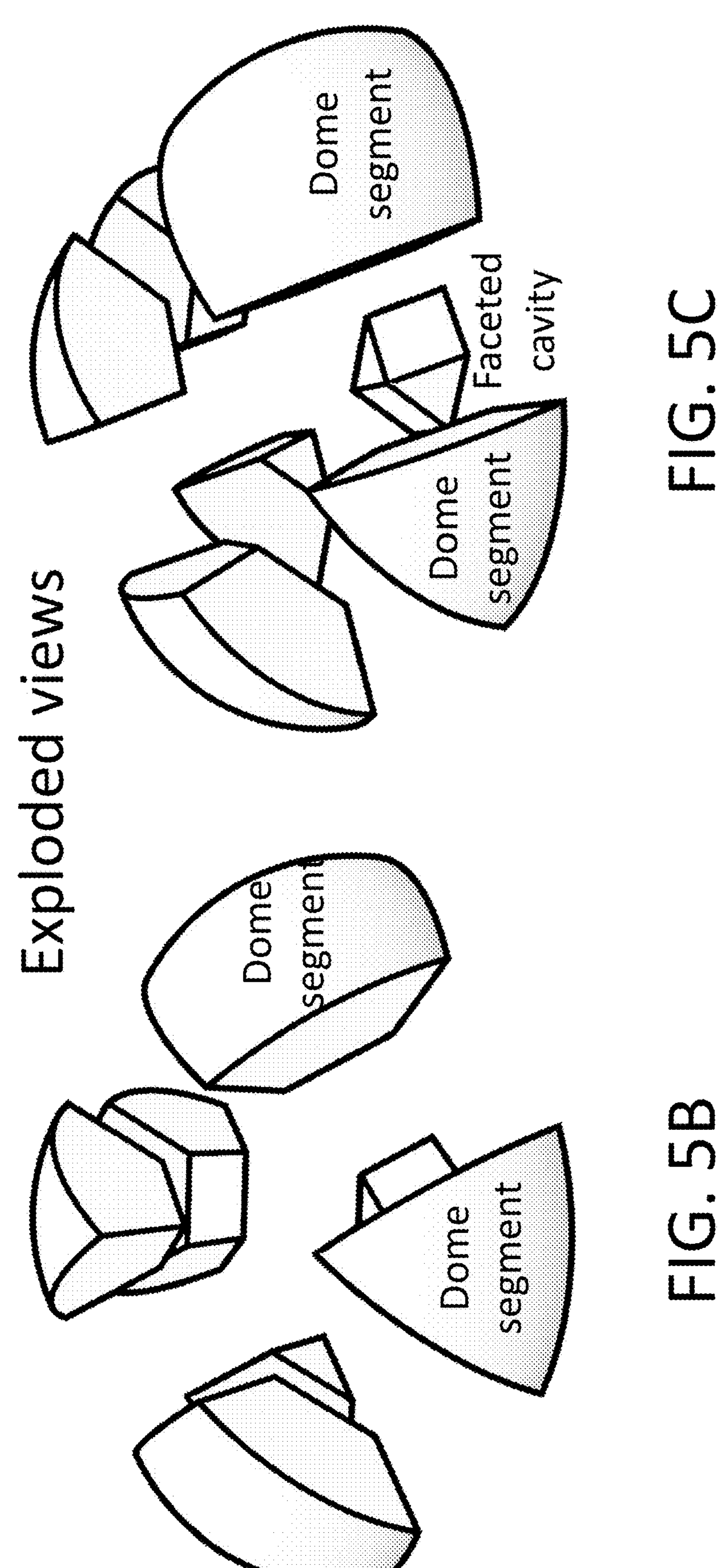

A dielectric dome may be used with faceted phased arrays, such as shown in FIGS. 5A to 5C. FIG. 5A illustrates a dielectric dome having a faceted cavity formed in its center. FIGS. 5B and 5C illustrate exploded views of the dielectric dome at different orientations. FIGS. 5B and 5C illustrate the portion of the dielectric dome that may act as a lens corresponding to a facet of the faceted cavity. The dielectric dome may have a spherically shaped outer surface (e.g., it may be a hemisphere in some implementations). The faceted cavity of the dielectric dome may take the form of the faceted arrays of FIGS. 4A and 4B, where the electro-optic devices 200 are arranged (regularly or irregularly) along the facets in positions within the cavity.

The faceted cavity may be formed in the bottom of a dielectric dome as illustrated in FIG. 5A. The dome may be segmented, as illustrated in FIGS. 5B and 5C, where each segment is responsible for beam forming at the corresponding facet. It should be appreciated that the dielectric dome may be formed as a single homogenous lens or may be made from several discrete segments. Thus, the dielectric material of each segment is structured to behave like a dielectric lens and focus incoming RF plane waves to points at the corresponding facet. The facets may be populated with the electro-optic devices 200 (including antennas) as described herein. Thus, rather than attaching an array of electro-optic devices 200 to the back surface of the Luneburg lens (as shown in FIGS. 1A to 1C), the electro optic devices 200 may be arranged in two dimensions on each facet of the cavity. The RF antennas to receive the focused RF radiation in a receiver, or transmit RF waves in a transmitter. In the latter case, the approximately spherical wave emanating from an antenna of the electro-optic device 200 located at the facet may become an approximately plane wave as it exits the dome. The dielectric-lens behavior of each dome segment may be achieved by filling the solid angle occupied by the dome with a convex dielectric RF lens. Alternatively, the dielectric constant of the material may be varied so as to produce a GRIN (gradient-index) lens filling the solid angle of the dome segment. In another embodiment, a diffractive lens may fill the solid angle of the dome segment to form an image of the RF scene on the respective facet.

Figure 6:
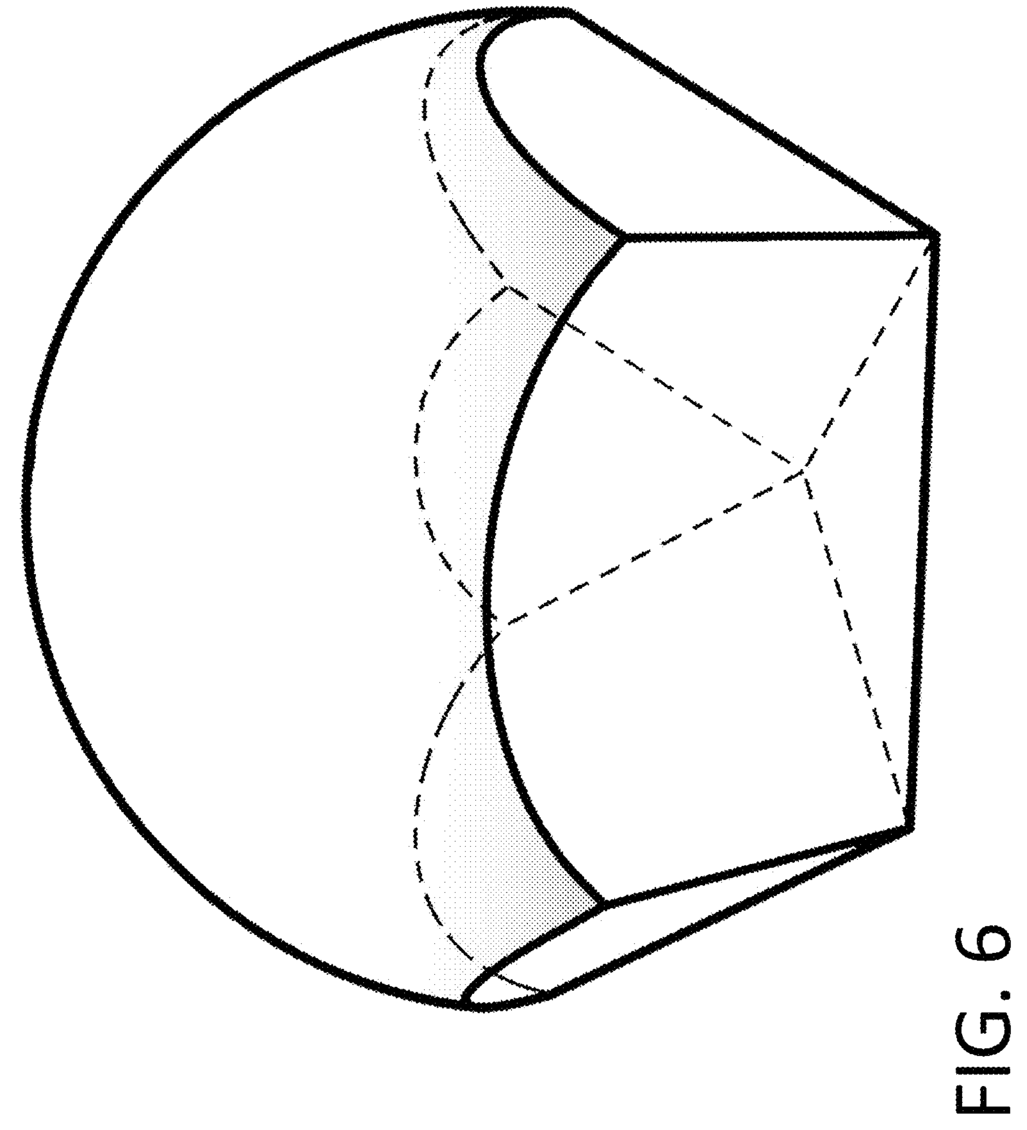

A Luneburg lens or other focusing lens may be utilized to form RF beams. FIG. 6 illustrates one embodiment where the Luneburg lens is used in combination with an array of electro-optic devices 200 described herein. As described herein, when implemented as an up-conversion module 200-up, the electro-optic device may comprise the RF antenna 210 to capture the incoming radiation followed, optionally, by a low-noise amplifier (LNA) and an electro-optic (EO) modulator. The components of each up-conversion module 200-up may be co-packaged in a single housing so as to minimize signal coupling losses. To simplify the system, the up-conversion module 200-up may utilize folded EO modulators where the optical input and optical output are located at one end of the modulator chip (photonic integrated circuit) whereas the RF input is on an opposite side of the modulator chip. As a result, the RF end of the up-conversion module 200-up may face the Luneburg lens, wherefrom the RF signals arrive, and the optical fibers connect at the opposite end of the up-conversion module 200-up.

In the TX mode of operation, the electro-optic device 200 may comprise a photo-detector, an amplifier (optionally), and an antenna. In this case, the modulated optical signal arrives at the photo-detector from the processor 400, which converts it to electrical signal that, after amplification, feeds an RF antenna. The approximately spherical RF wave originating at the antenna is launched into the Luneburg lens, which converts it to an approximately plane wave for propagation in free space.

The TX and RX functionality may be combined in a single electro-optic device 200 with the antenna shared between TX and RX or with separate antennas serving the two functions. To this end, the transmitted signal may be isolated from the received signal by time-division multiplexing, frequency-division multiplexing, an RF circulator, or a combination thereof.

Notably, a Luneburg lens focuses incoming plane waves on the surface of the lens opposite the incoming wave. To accommodate the electro-optic devices 200, a 'socket' array may be fabricated, e.g., 3D printed, that conforms to the spherical surface and accepts the electro-optic devices 200 to hold them against the Luneburg lens. Additionally, in some applications, it may be advantageous to focus the incoming radiation on a planar, rather than curved, surface so that the array of electro-optic devices 200 follows a planar geometry (e.g., arranged in two dimensions on a flat surface). Such functionality may be achieved by utilizing the methods of transformational optics to convert the curved focal surface to a focal plane. Furthermore, wide field of view may be achieved by combining several such planar surfaces into a faceted bottom of a modified Luneburg lens, as in an exemplary illustration of FIG. 6. The desired faceting may be generated using regular polyhedron as shown in the figure where a part of a truncated octahedron is used. Alternatively, for ease of fabrication, square facets may be used in a configuration similar to that of FIG. 4B. Applicant notes that although US 2022/0239007 A1 and WO 2021/236822 A1 describe a faceted-bottom modified Luneburg lens for RF beam forming, these publications do not appear to use regular polyhedra or square/rectangular facets to define the planar surfaces and without using such regular structures, may have disadvantages in system fabrication and/or performance.

Optical communication between the elements of the Luneburg lens-based radio head and the processing unit may be also established using photonic heterodyne link with homodyne detection (PHH link) described elsewhere herein. The PHH link inherently down-converts the incoming RF signal to IF while relying on a particularly simple EO phase modulator in the radio head and TOPS to generate the frequency-offset laser outputs. The use of a down-converting link may simplify the down-stream electronics for signal processing and increase the effective number of bits available at the output as compared to direct digitization of the signal at the incoming RF.

When detecting broadband signals, the processing may benefit from optical channelizing prior to conversion from optical to electrical domain, as described in U.S. patent provisional application No. 63/272,457 (herein incorporated by reference in its entirety). In addition, when the opto-electronic devices are implemented as PIC-s, additional circuitry may be included with the PIC, such as PD-s, TIA-s, and/or ADC-s (e.g., arrayed-waveguide-grating (AWG) PIC-s implemented in SOI).

For efficient signal transport between the Luneburg lens-based radio head and the processing unit, a multi-core optical fiber may be used in place of the optical fiber bundle illustrated in FIGS. 1A and 1B. In the RX case, the optical outputs of multiple up-conversion modules 200-up may be combined in a single multi-core fiber, where each core is responsible for carrying the optical beam originating at one up-conversion module 200-up. The optical signals from the different cores of the multi-core fiber may be separated for processing at the processor 400. In the TX case, the modulated optical signals destined for the Luneburg lens-based radio head are combined in a multi-core fiber where each core is responsible for conveying signal to a particular electro-optic device 200. At the radio head, the signals are separated and routed to the respective electro-optic device 200.

The use of a single optical fiber for signal transport between the radio head and the processing unit may also be accomplished by wavelength-division multiplexing (WDM). In the RX case, multiple optical carriers having different wavelengths are delivered to the radio head using a single fiber. At the radio head, the wavelengths are separated using AWG and routed to the up-conversion modules 200-up where each electro-optic device 200 may receive an optical carrier with its own dedicated wavelength. Upon modulation, the now modulated optical signals may be combined using another AWG for transport back to the processor 400 on a single optical fiber. The same or separate fibers may be used for the delivery of the optical carriers and for the return of the modulated optical signals. When using a single fiber for optical communication in both directions, optical circulators may be used to separate the incoming and outgoing optical beams at the radio head and at the processor 400.

What is claimed is:

1. A receiver comprising:

a Luneburg lens; and a plurality of up-conversion modules attached to the Luneburg lens, wherein each of the plurality of up-conversion modules comprises an antenna element positioned to capture an incoming RF beam focused by the Luneburg lens onto the antenna element and convert the same to an RF electrical signal and an electro-optic modulator configured to up-convert the RF electric signal to the optical domain by modulating an optical carrier with the RF electrical signal provided by the antenna element, wherein each electro-optic modulator comprises an RF transmission line electrically connected to the antenna element and an optical modulation layer forming an optical waveguide, the optical waveguide having an input to receive the optical carrier and positioned adjacent to the RF transmission line to allow an electromagnetic field of the RF electrical signal to overlap the optical waveguide and modulate the optical carrier with the electromagnetic field, wherein the RF transmission line lies within a plane and comprises an electrically conductive strip that is configured to carry the RF electrical signal from the antenna element, wherein the optical waveguide comprises an optical waveguide core formed within the optical modulation layer, and wherein the conductive strip of the RF transmission line overlaps the optical waveguide core and has a shape corresponding to a shape of the optical waveguide.

2. The receiver of claim 1, wherein the RF transmission line is a coplanar transmission line comprising the electrically conductive strip and a pair of outer adjacent lines that extend along opposing sides of the electrically conductive strip.

3. The receiver of claim 2, further comprising a patterned insulating layer in which the coplanar transmission line is formed, the patterned insulating layer comprising a first trench, within which the electrically conductive strip is formed, a second trench, within which a first outer adjacent line of the pair of outer adjacent lines is formed, and a third trench, within which a second outer adjacent line of the pair of outer adjacent lines is formed.

4. The receiver of claim 1, wherein the optical waveguide core extends along a non-linear path within the optical modulation layer.

5. The receiver of claim 4, wherein the non-linear path of the optical waveguide core comprises a first linearly-extending segment, a second linearly-extending segment, and a curved segment, wherein the curved segment connects the first linearly-extending segment and the second linearly-extending segment such that the optical carrier travels within the first linearly-extending segment, the second linearly-extending segment, and the curved segment.

6. The receiver of claim 5, wherein the electrically conductive strip extends along a non-linear path that overlaps the non-linear path of the optical waveguide core, and wherein the non-linear path of the electrically conductive strip matches a shape of the non-linear path of the optical waveguide core.

7. The receiver of claim 6, wherein each of the non-linear path of the optical waveguide core within the optical modulation layer and the non-linear path of the electrically conductive strip comprises a plurality of parallel linear segments, adjacent ones of which are connected by corresponding curved segments.

8. The receiver of claim 6, further comprising a photonic filter optically coupled to the optical waveguide, the photonic filter being formed in the optical modulation layer and comprising a waveguide formed as a discrete loop and configured to filter one or more frequencies of a modulated optical signal that is generated when the optical carrier is modulated with the electromagnetic field.

9. A receiver comprising:

a Luneburg lens; and a plurality of up-conversion modules attached to the Luneburg lens, wherein each of the plurality of up-conversion modules comprises an antenna element positioned to capture an incoming RF beam focused by the Luneburg lens onto the antenna element and convert the same to an RF electrical signal and an electro-optic modulator configured to up-convert the RF electric signal to the optical domain by modulating an optical carrier with the RF electrical signal provided by the antenna element, wherein each electro-optic modulator comprises an RF transmission line electrically connected to the antenna element and an optical modulation layer forming an optical waveguide, the optical waveguide having an input to receive the optical carrier and positioned adjacent to the RF transmission line to allow an electromagnetic field of the RF electrical signal to overlap the optical waveguide and modulate the optical carrier with the electromagnetic field; and a base substrate, wherein the antenna element, the RF transmission line, the optical modulation layer, and the base substrate are integrated as a stack and are located within a footprint of the antenna element.

10. The receiver of claim 9, wherein each up-conversion module is integrated in a corresponding chip.

11. A receiver comprising:

a Luneburg lens; and a plurality of up-conversion modules attached to the Luneburg lens, wherein each of the plurality of up-conversion modules comprises an antenna element positioned to capture an incoming RF beam focused by the Luneburg lens onto the antenna element and convert the same to an RF electrical signal and an electro-optic modulator configured to up-convert the RF electric signal to the optical domain by modulating an optical carrier with the RF electrical signal provided by the antenna element, wherein each electro-optic modulator comprises an RF transmission line electrically connected to the antenna element and an optical modulation layer forming an optical waveguide, the optical waveguide having an input to receive the optical carrier and positioned adjacent to the RF transmission line to allow an electromagnetic field of the RF electrical signal to overlap the optical waveguide and modulate the optical carrier with the electromagnetic field, and wherein each up-conversion module comprises a housing attached to the Luneburg lens, wherein the antenna element, the RF transmission line, and the optical modulation layer are positioned within the housing.

12. The receiver of claim 11, wherein the housing is formed of an electrically-conductive metal that forms an RF shield from external RF signals for the antenna element, the RF transmission line, and the optical modulation layer forming the housing.

13. The receiver of claim 12, wherein a first end of the housing is attached to the Luneburg lens and comprises an opening that exposes the antenna element to the Luneburg lens.

14. The receiver of claim 12, wherein a first end of the housing is attached to the Luneburg lens and is formed from an RF transparent material such that the antenna element is in RF communication with the Luneburg lens to receive the RF beam through the RF transparent material.

15. The receiver of claim 12, wherein each up-conversion module comprises an optical connector in optical communication with an output of the optical waveguide and attached to a corresponding housing to attach the housing to an optical fiber.

16. A receiver comprising:

a Luneburg lens; and a plurality of up-conversion modules attached to the Luneburg lens, wherein each of the plurality of up-conversion modules comprises an antenna element positioned to capture an incoming RF beam focused by the Luneburg lens onto the antenna element and convert the same to an RF electrical signal and an electro-optic modulator configured to up-convert the RF electric signal to the optical domain by modulating an optical carrier with the RF electrical signal provided by the antenna element, wherein each electro-optic modulator comprises an RF transmission line electrically connected to the antenna element and an optical modulation layer forming an optical waveguide, the optical waveguide having an input to receive the optical carrier and positioned adjacent to the RF transmission line to allow an electromagnetic field of the RF electrical signal to overlap the optical waveguide and modulate the optical carrier with the electromagnetic field, and wherein the antenna element, the RF transmission line, and the optical modulation layer are formed as a stack of integrated layers that are joined together in a package that is attached to the Luneburg lens.

17. The receiver of claim 1, wherein the optical modulation layer extends in a first direction, and wherein the RF transmission line lies within the plane positioned between the optical modulation layer and the antenna element, and wherein the first direction is parallel to the plane.

18. A receiver comprising:

a Luneburg lens; and a plurality of up-conversion modules attached to the Luneburg lens, wherein each of the plurality of up-conversion modules comprises an antenna element positioned to pick up an incoming RF beam focused by the Luneburg lens onto the antenna element and convert the same to an RF electrical signal, and an electro-optic modulator that up-converts the RF electric signal to the optical domain by modulating an optical carrier with the RF electrical signal provided by the antenna element, the electro-optic modulator comprising:

an RF transmission line configured to receive the RF electrical signal from the antenna element and generate a corresponding electromagnetic field; and an optical modulation layer adjacent to the RF transmission line and within the corresponding electromagnetic field such that the electromagnetic field modulates the optical carrier in an optical waveguide of the optical modulation layer and generates a modulated optical signal, wherein the antenna element, the RF transmission line, and the optical modulation layer are integrated together in a package that is attached to the Luneburg lens, wherein the package comprises a molding compound that encapsulates the antenna element, the RF transmission line, and the optical modulation layer.

* * * * *